March 29, 1966   W. KLEINSTÜCK   3,243,017
HYDRAULICALLY OPERABLE DISC BRAKES FOR MOTOR VEHICLES
Filed July 2, 1964
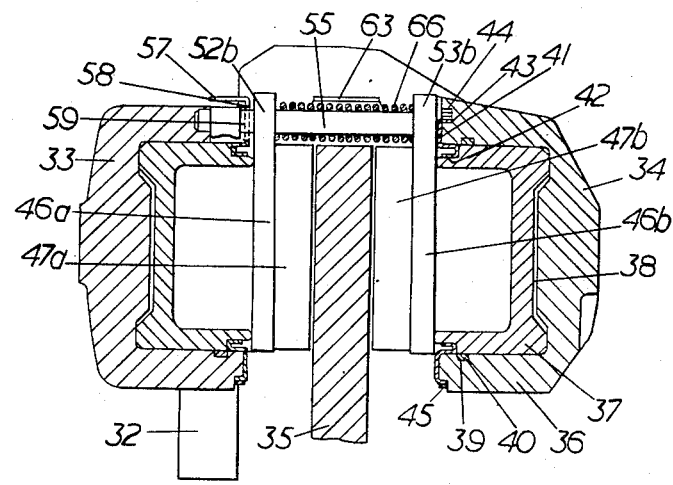
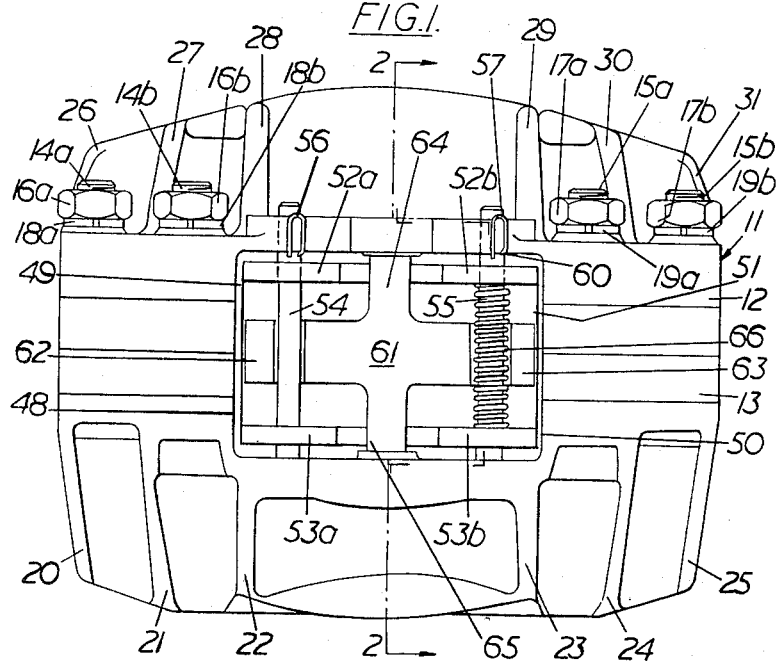
Inventor
WERNER KLEINSTÜCK
By O. O. McIntosh
Attorney

United States Patent Office 3,243,017
Patented Mar. 29, 1966

3,243,017
HYDRAULICALLY OPERABLE DISC BRAKES FOR MOTOR VEHICLES
Werner Kleinstück, Russelsheim-Hassloch, Germany, assignor to General Motors Corporation, Detroit, Mich., a corporation of Delaware
Filed July 2, 1964, Ser. No. 379,956
2 Claims. (Cl. 188—73)

This invention relates to hydraulically operable disc brakes for motor vehicles.

Such disc brakes comprise in the main a rotary brake disc and a brake caliper which embraces part of the brake disc, and is usually secured to a flange of the stub axle. Brake actuator cylinders which can be supplied with pressure medium are arranged in flank portions of the brake caliper at one or both sides of the brake disc.

During actuation of the brake, actuator pistons sliding in the respective brake actuator cylinders act by way of brake shoe support members to urge the brake shoes against the disc. The brake shoes are firmly connected to the brake shoe support members. In the peripheral direction of the brake disc, both the actuator cylinders and the brake shoe members are guided by abutment faces in the brake caliper; in the axial direction, the brake shoe support members are guided effectively and satisfactorily by the actuator pistons and cylinders.

In order to ensure easy access to the parts and to ensure that jamming is obviated, the brake shoe support members in particular must be fitted with adequate clearance. However, in brakes of the disc type, on account of the high application pressures and with a view to ensuring rapid response of the brake, the braking clearance must be kept particularly small, with the result that there is a risk of a small entraining force being exerted on the brake shoe when the braking system is not under pressure, this being caused by rubbings worn off the lining which collect between the brake disc and the shoes. This gives rise to a turning moment which tends to tilt the shoe and cause it to press more firmly against the brake disc at the run-in side, whereby unpleasant squeaking noises are produced.

It is an object of the present invention to eliminate the described defect in disc brakes.

It is also an object of the present invention to allow a resilient member to act upon the brake shoe support members at the run-in or entry side of the brake disc in the opposite direction to the direction of brake actuation.

The resilient member may be constructed as a thrust member, interposed at the run-in side between the brake shoe support members of the oppositely facing brake shoes.

The resilient thrust member is advantageously a helical compressing spring.

It is a further object of the invention to utilise, in connection with a disc brake which is of the type described and has a pair of brake shoe support members each having two eyes by means of which the support members are guided on pins which are supported by the brake caliper, a helical compression spring which is mounted coaxially on the guide pin at the run-in side of the brake shoe support members and presses against mutually opposite eye portions of the brake shoe support members.

An embodiment of the invention will now be described for the purpose of illustration with reference to the accompanying drawing, in which:

FIGURE 1 is a view of the brake caliper seen externally; and

FIGURE 2 is a section along the line 2—2 in FIGURE 1, in the direction of the arrows.

As shown in the drawings, a brake caliper 11 consists of two halves 12 and 13 which are interconnected by means of pairs of screw bolts 14a, 14b and 15a, 15b fitted with nuts 16a, 16b and 17a, 17b and spring washers 18a, 18b and 19a, 19b. In the region of the bolt connections, the housing is reinforced by ribs 20 to 31. On the underside, a flange 32 of the brake caliper is provided with two bores (not shown) for attachment of the brake caliper to a flange of a stub axle.

The brake caliper has two flanks 33 and 34 which extend on both sides of a brake disc 35. A hydraulic actuator device is located in each flange; since both actuator devices are of identical construction, only one of them will be described. Each actuator device comprises a brake actuator cylinder 36 and an actuator piston 37 which can be supplied with pressure medium. A pressure space 38 for the pressure medium is sealed off by a rubber ring 40 inserted in a groove 39 in the cylinder 36. The rubber ring 40 at the same time ensures that when the brake system is depressurized the restoring force inherent in the rubber ring returns the piston by the amount of braking clearance. When, with the brake shoe worn, the force with which the rubber ring adheres to the piston is exceeded, the piston slides past the rubber ring by the amount of shoe wear and thus keeps the brake clearance constant.

Sealing against dust and water spray is effected by a rubber seal 41 of U-shaped cross-section at the side facing the brake disc 35. The seal 41 is mounted on a shoulder 42 at the outer periphery of the piston, and also has a turned-back flange 43 part of which fits round the wall at the front face of the cylinder and part of which extends into an annular groove 44 in the cylinder. The flange 43 of the rubber seal 41 is held on its annular seat by means of a clamping ring 45.

On the two sides of the brake disc 35 and at a slight distance from it are a pair of brake shoe support members 46a and 46b which have brake shoes 47a and 47b firmly connected to them. To allow them to take up the braking effort, the brake shoes are guided at right angles to the peripheral direction between parallel stops 48, 49 and 50, 51. The brake shoe support members 46b and 46a are each provided at their outer edge with two eye portions 52a, 52b and 53a, 53b respectively by means of which they are guided on steel guide pins 54 and 55. The pins are mounted in the brake caliper and are each secured against displacement by means of a folded spring clamp 56, 57. One arm 58 of the spring clamp is straight and is introduced into a bore 59 of the pin, and the other arm 60 rests against the steel pin for about half a circumference, whereby the spring clamp is secured in position. In the vicinity of the guide pins 54 and 55 there is a cruciform flat spring 61, which has one arm 62 which engages under the pin 54 and an opposite arm 63 which engages under an attachment flange of the caliper halves 12 and 13. Transversely extending arms 64 and 65 of the cruciform flat spring 61 press upon the upper edges of the brake shoe support members 46a and 46b and thus prevent rattling noises which could otherwise occur due to clearance between the guide pins 54 and 55 and the brake shoe support members 46a and 46b.

The flat spring 61 also performs the function of a spreader spring. When the brake is not being operated, the transversely extending arms 64 and 65 produce an axial force component which lifts the brake shoes 47a and 47b from the brake disc 35. However, in no position of the brake shoe support members 46a and 46b should the spreading force of the flat spring be so great that it could overcome the frictional resistance of the rubber ring 40 against displacement of the piston.

At the run-side of the brake disc 35, a helical compression spring 66 is arranged on the guide pin 55 between the eye portions 52b and 53b of the brake shoe support members 46a and 46b. By acting as a thrust member, the spring 66 counteracts the force of the pistons acting in the direction of brake actuation.

This spring 66 prevents troublesome squeaking noises because, when the braking system is depressurized, the spring ensures that the brake shoes are free of the brake disc at the run-in side.

I claim:
1. A hydraulically operable disc brake comprising:
   a rotary brake disc,
   a fixed brake caliper embracing part of said brake disc,
   actuator cylinder means disposed within said brake caliper and having actuator piston means slidably mounted therein for movement substantially perpendicular to the plane of rotation of said brake disc,
   a pair of brake shoe support members having brake shoes carried thereon and movable by said actuator piston means into engagement with opposite sides of said brake disc,
   retractive force-exerting and retractive force-limiting means retracting said actuator piston means and limiting the retractive movement thereof upon hydraulic release of said actuator piston means,
   first resilient means engaging the upper center edges of said brake shoe support members and force loaded by actuation of said actuator piston means with a total force load less than the retractive limiting force of said retracting means and acting upon each of said brake support members in the opposite direction to the direction of brake actuation to move said brake shoe support members away from said brake disc, and second resilient means force loaded by actuation of said piston means and acting only upon the run-in side of each of said brake shoe support members in the opposite direction to the direction of brake actuation to move the run-in sides of each of said brake shoe support members away from said brake disc.

2. The disc brake of claim 1, said first resilient means being a generally cruciform leaf spring, two opposed ends of which extend in the direction of rotation of said disc radially outward therefrom and engage said brake caliper, and the other two opposed ends of which respectively engage the upper center edges of said brake shoe support members.

References Cited by the Examiner

UNITED STATES PATENTS

| 2,790,516 | 4/1957 | Wright et al. | 188—73 |
| 2,862,581 | 12/1958 | Lucien | 188—73 |
| 2,938,609 | 5/1960 | Burnett | 188—73 |
| 2,968,370 | 1/1961 | Ruet | 188—73 |
| 2,973,837 | 3/1961 | Wilson | 188—73 |
| 2,987,142 | 6/1961 | Gracie | 188—73 X |
| 3,139,157 | 6/1964 | Hodkinson | 188—73 |

FOREIGN PATENTS

| 1,105,308 | 6/1955 | France. |
| 875,158 | 8/1961 | Great Britain. |
| 934,172 | 8/1963 | Great Britain. |

MILTON BUCHLER, *Primary Examiner.*

G. E. A. HALVOSA, *Assistant Examiner.*